G. REMNSNIDER.
STREET SWEEPER.
APPLICATION FILED MAY 7, 1908.
918,910.
Patented Apr. 20, 1909.
3 SHEETS—SHEET 2.
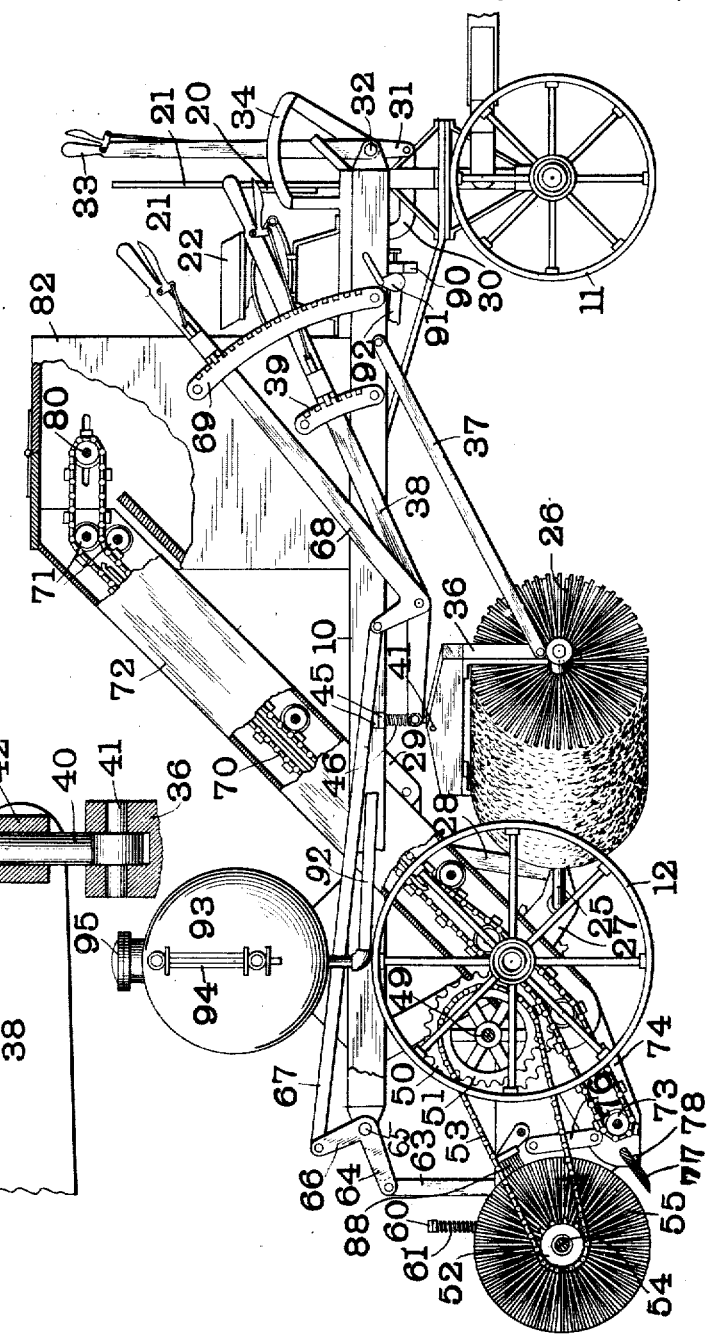
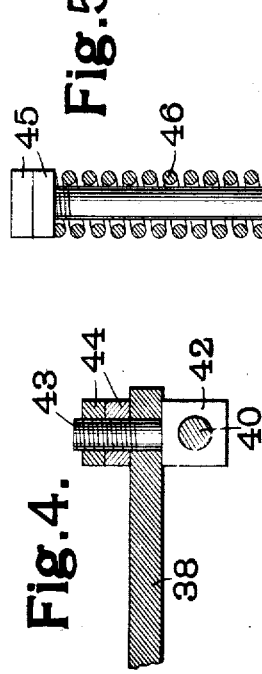
Witnesses:
L. L. Mead.
W. A. Alexander
Inventor
George Remnsnider
By his Attorneys
Fowler & Bryson

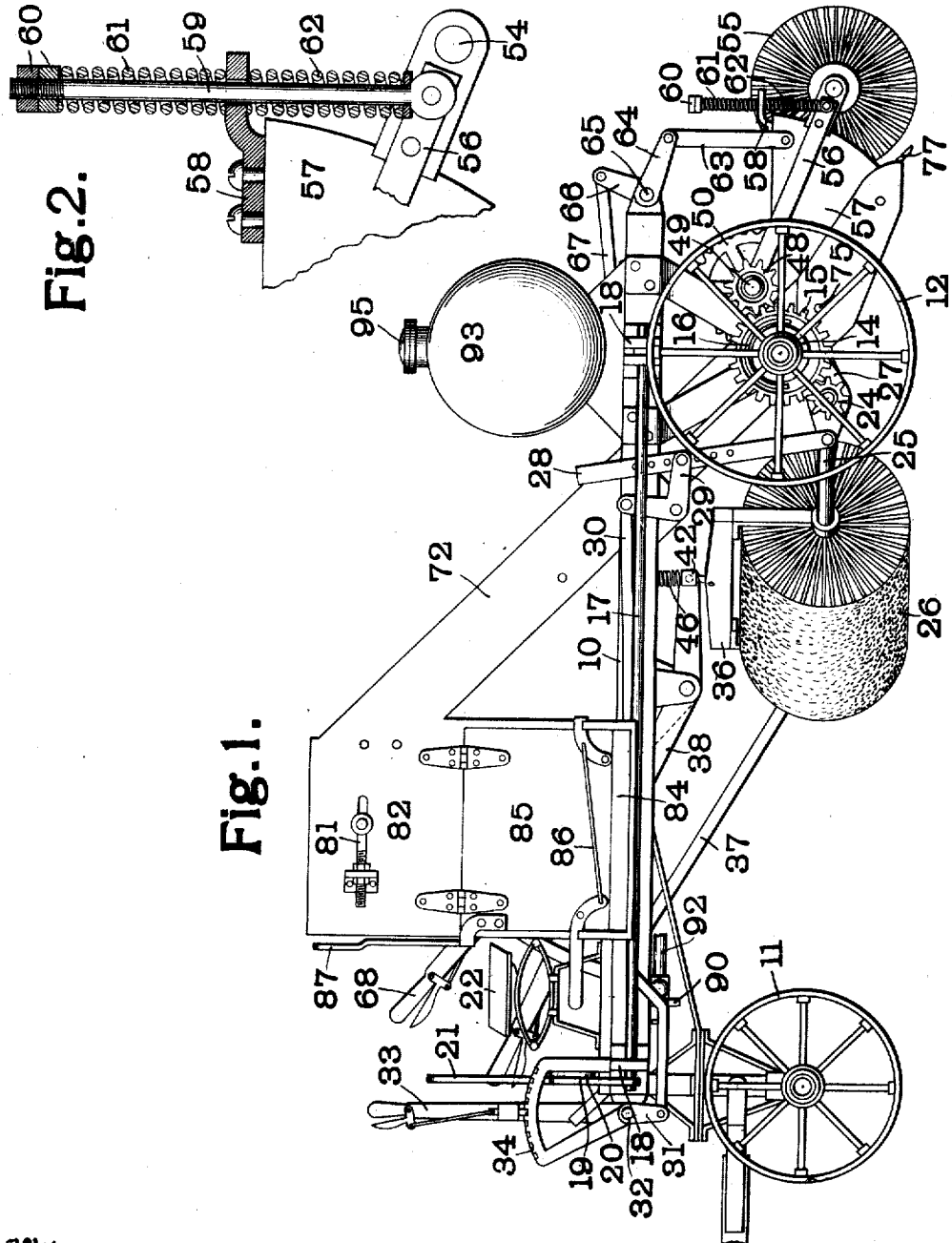

G. REMNSNIDER.
STREET SWEEPER.
APPLICATION FILED MAY 7, 1908.

918,910.

Patented Apr. 20, 1909.
3 SHEETS—SHEET 3.

Witnesses:
L. L. Mead
W. A. Alexander

Inventor
George Remnsnider
By his Attorneys:
Fowler H Bryson

UNITED STATES PATENT OFFICE.

GEORGE REMNSNIDER, OF BELLEVILLE, ILLINOIS.

STREET-SWEEPER.

No. 918,910.

Specification of Letters Patent.

Patented April 20, 1909.

Application filed May 7, 1908. Serial No. 431,298.

*To all whom it may concern:*

Be it known that I, GEORGE REMNSNIDER, a citizen of the United States, residing at Belleville, in the county of St. Clair and State of Illinois, have invented a certain new and useful Street-Sweeper, of which the following is such a full, clear, and exact description as will enable any one skilled in the art to which it appertains to make and use the same, reference being had to the accompanying drawings, forming part of this specification.

My invention relates to street sweepers, and has for its object the production of a street sweeper which will be simple in construction and effective in operation, and the brushes of which may be readily adjusted to meet all requirements.

Figure 6:
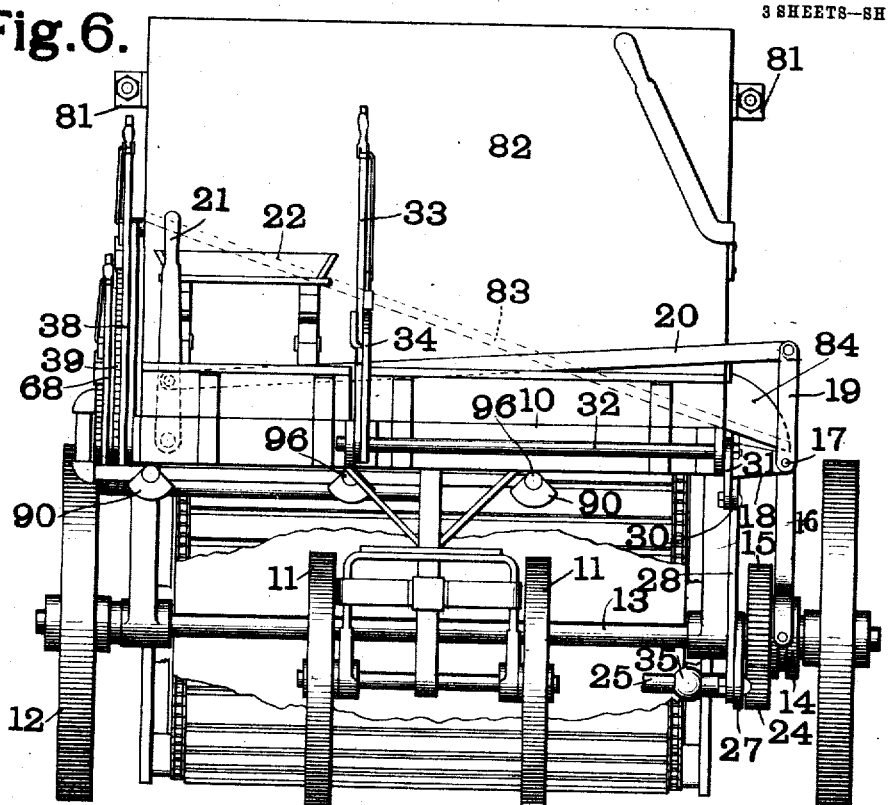
Figure 7:
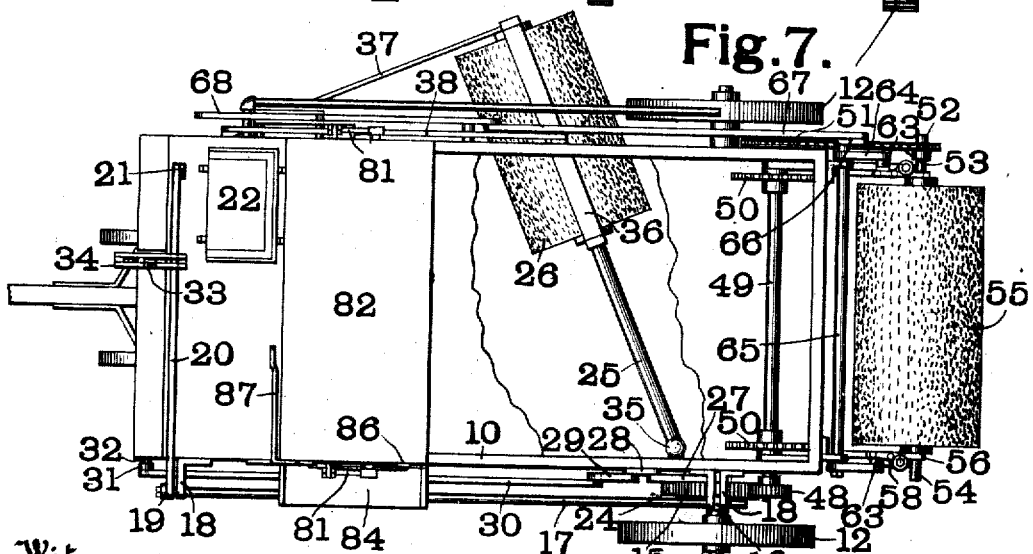

In the accompanying drawings, which illustrate one form of street sweeper made in accordance with my invention, Figure 1 is a side elevation, Fig. 2 is an enlarged sectional view showing the manner of supporting the rear brush, Fig. 3 is a side elevation, partly in section, looking at the opposite side from Fig. 1, Figs. 4 and 5 are enlarged detailed views showing the manner of supporting the forward brush, Fig. 6 is a front elevation and Fig. 7 is a top plan view on a reduced scale.

Like marks of reference refer to similar parts in the several views of the drawings.

10 is the body or frame of the device, said body or frame being supported on front wheels 11 and rear wheels 12. Adjacent to one of the rear wheels 12 the rear axle 13 is surrounded by a clutch 14 adapted to be thrown into and out of engagement with the adjacent wheel 12 and driving the gear wheel 15 from which the brushes and conveyer are driven, as will be hereinafter described. The clutch 14 is engaged by a bifurcated lever 16 which is rigidly secured to a rock shaft 17. The rock shaft 17 is supported by brackets 18 on the frame 10 and has rigidly secured to its forward end an arm 19, best shown in Fig. 6. Pivoted to the upper end of this arm 19 is one end of the link 20 to the opposite end of which is pivoted a hand lever 21 situated adjacent to the driver's seat 22, so as to be within reach of the driver, who may thus throw the clutch 14 into or out of engagement with the wheel 12. The gear wheel 15 meshes with a gear wheel 24 mounted upon the end of the shaft 25 carrying the front brush 26. The end of this shaft 25 carrying the wheel 24 is journaled in a plate 27 pivotally mounted upon the axle 13 of the rear wheels. This plate 27 is adapted to be swung with the axle as a pivot by means of an arm 28 which is engaged by a bell crank 29. This bell crank 29 is pivoted to one end of the link 30, the opposite end of which is pivoted to an arm 31 carried by a rock shaft 32. This rock shaft 32 is adapted to be actuated by a hand lever 33 engaging with a suitable toothed rack 34 for retaining it in the desired position. The brush 26 is placed at an angle to the remaining parts of the machine, as best shown in Fig. 7. In order to allow for its various movements, the shaft 25 is provided near the plate 27 with a universal joint 35.

Embracing the brush 26 and engaging with the shaft 25 is a U-shaped frame or yoke 36 which is attached to the frame 10 by means of a link 37. This frame 36 is adapted to raise and lower the brush 26 through the medium of a hand lever 38 adapted to engage with a toothed rack 39. The connection between the hand lever 38 and the frame 36 is best shown in Figs. 4 and 5. A bolt 40 is pivoted to the frame 36 by a pin 41 so as to allow a rocking movement between the bolt and the frame in the direction of the length of the shaft 25. This bolt 40 passes through a block 42 carried on a threaded stud 43 which passes through the hand lever 38 and is engaged by lock nuts 44. The lock nuts 44 are provided so that stud 43 may be allowed to rotate freely in the lever 38. The upper end of the bolt 40 is provided with lock nuts 45 between which and the block 42 is arranged a coil spring 46 so that the brush 26 may have a certain amount of movement relative to the hand lever 38.

It will be evident from the above description that the brush 26 may be raised or lowered to bring it into and out of operative position by means of the hand lever 38 and at the same time by means of the hand lever 33 the angle of the brush may be varied to adapt it to the slant of the street on which it operates, the universal joint 35 and the connection between the frame 36 and the lever 38 allowing for the necessary movements of the parts.

Engaging with the gear wheel 15 is a gear wheel 48, Fig. 1, which is rigidly secured to a shaft 49 upon which are mounted two wheels 50 from which the conveyer is driven, as will be hereinafter described. The shaft 49 is also provided with a sprocket wheel 51 around which and the sprocket wheel 52 passes a sprocket chain 53. The sprocket wheel 52 is rigidly mounted upon the shaft 54 of the rear brush 55. This shaft 54 is mounted on arms 56 which are pivotally mounted on the shaft 49 so that when the brush 55 is raised or lowered the tension of the sprocket chain is not disturbed. In order to protect the brush 55 and at the same time provide means for raising and lowering it, a hood 57 is provided which is also pivoted on the shaft 49. This hood 57 is provided with lugs 58 shown in detail in Fig. 2, through which pass the bolts 59 secured to the arms 56 and provided at their upper end with lock nuts 60. Between the lock-nuts 60 and the lug 58 is an upper coil spring 61 and between the lug 58 and the arm 56 is a lower coil spring 62. By this construction, when the hood 57 is raised and lowered, the brush 55 is also raised and lowered and at the same time a certain amount of relative movement is allowed between the brush and hood by the action of the coil springs 61 and 62 so that the brush may adapt itself to the surface upon which it works to a certain extent without disturbing the hood. In order to raise and lower the hood 57, I attach to it a pair of links 63 which are pivoted to arms 64 rigidly attached to the shaft 65. The arm 64 at one side of the device is provided with a second arm 66 so as to form a bell crank lever. To this arm 66 is pivoted one end of a link 67, the opposite end of which is pivoted to a hand lever engaging with a toothed segment 69 for holding it in the desired position. The hand lever 69 terminates adjacent to the seat 22 so that the driver may raise and lower the rear brush 55 by manipulating said lever.

The wheels 50 hereinbefore referred to engage with the conveyer 70 passing around and over suitable supporting wheels 71 mounted in a conveyer trough 72. The lower end of the conveyer 70 passes around a pair of auxiliary supporting wheels 73 mounted between a pair of swinging plates 74 pivoted to the conveyer trough 72 at 75, Fig. 1. These plates 74 are attached to the hood 57 by means of links 76, Fig. 3, so that the said plates 74 are raised and lowered together with the said hood 57. Between the plates 74 is pivoted a board 77 which terminates adjacent to the brush 55 so that the material engaged by said brush is guided by said board on to the conveyer 70, as will be evident from an inspection of Fig. 3. Stops 78 are provided for preventing the pivoted board 77 from coming in contact with the street to be swept. The upper end of the conveyer 70 passes around auxiliary wheels 80 which are provided with adjusting devices 81 for taking up any slack in the said conveyer 70.

These wheels 80 are situated in a hopper 82 provided with a slanting bottom 83, as shown in dotted lines in Fig. 6. This slanting bottom 83 terminates in a chute 84 adjacent to the door 85. This door 85 is provided with a suitable latching device 86 and with a handle 87 for assisting in opening and closing the said door. 88 is a brush adapted to bear upon brush 55 so as to remove any adhering particles therefrom.

In order to dampen the street before the brushes operate upon it and thus prevent the scattering of dust by the brushes, I provide a number of nozzles 90 which are controlled by a suitable valve 91. Leading from this valve 91 is a pipe 92 which is connected with a supply tank 93 carried near the rear end of the frame 10. This supply tank 93 is provided with a suitable water gage 94 and with an inlet 95 for filling said tank. In addition to the valve 91 for controlling the supply of water to the nozzles, I prefer to supply each of said nozzles with a regulating valve 96 so that the amount of the discharge of each valve may be individually regulated.

The brushes 26 and 55 may be of any suitable construction. I prefer, however, to use brushes made of split bamboo set in wooden hoops, as I find this form of brush to be most effective for my purpose.

In the operation of my device the brushes 26 and 55 are lowered into the proper position, the brush 55 being manipulated by means of the hand lever 68. The brush 26 must not only be lowered but, on account of its projecting to one side of the sweeper, as shown in Fig. 7, it must be adjusted to the slope of the side of the street. This is accomplished by the combined manipulation of the hand levers 33 and 38. The clutch 14 is now thrown into operative position by means of the hand lever 21, and consequently the brushes 26 and 55 and the conveyer or elevator 70 are operated from the gear wheel 15 through the mechanism hereinbefore described. The brush 26, owing to its angular position at one side of the sweeper, throws the dirt toward the center of the machine so that it may be engaged by the brush 55. The action of the brush 55 throws the dirt against the board 77 by which it is guided to the conveyer 70. Owing to the pivoting of the board 77, it readily passes over any obstruction and again drops into operative position. The dirt swept onto the conveyer 70 by the brush 55 is carried by the conveyer and finally deposited in the hopper 82. When sufficient dirt has accumulated in the hopper 82, the door 85 is released by means of the locking devices 86 and the dirt allowed to fall out into any suitable receptacle. Owing to the mounting of the brushes, they have a certain amount of movement independent of the adjusting levers and consequently can adjust themselves to any inequalities in the street which is being swept. Tank 93 furnishes water to the nozzle 90 so that the street immediately in front of the brushes may be dampened to a degree sufficient to lay the dust. When the sweeper is not in operation, the brushes 26 and 55 are raised out of contact with the street and at the same time the clutch 14 is released by the hand lever 21.

Having fully described my invention, what I claim as new and desire to secure by Letters Patent of the United States is:

1. In a street sweeper, the combination with a wheeled frame, of a rotary brush attached to said frame, a hood pivotally carried by said frame, connections between said hood and brush permitting a limited relative movement, means for raising and lowering said hood, a conveyer having its lower end connected to said hood, and a guide-board coöperating with said conveyer.

2. In a street sweeper, the combination with a wheeled frame, of a rotary brush pivotally carried on said frame, a pivotal member carried by said frame for raising and lowering said brush and having movement relative thereto, a second pivotal member connected with said first pivotal member, a guide board pivoted to said second pivotal member, and a conveyer coöperating with said guide board.

3. In a street sweeper, the combination with a wheeled frame, of a rotary brush pivotally carried by said frame, a member pivoted to said frame and having yielding connection with said brush, a second pivotal member provided with a guide board and connected with said first pivotal member, and a conveyer coöperating with said guide board.

4. In a street sweeper, the combination with a wheeled frame, of a rotary brush pivotally carried by said frame, a pivotal member carried by said frame and having yielding connection with said brush, a second pivotal member connected with said first pivotal member, a pivoted guide board carried by said second pivotal member, and a conveyer coöperating with said guide board.

5. In a street sweeper, the combination with a wheeled frame, of a rotary brush pivotally carried by said frame, a pivotal member carried by said frame and having yielding connection with said brush, a second pivotal member connected to said first pivotal member, a guide board carried by said second pivotal member, and a conveyer coöperating with said guide board and partially carried by said second pivotal member.

6. In a street sweeper, the combination with a wheeled frame, of a rotary brush inclined to said frame, a yoke carrying said brush, adjustable means engaging said yoke intermediate of its ends for raising and lowering said brush, a driving shaft for said brush, and means for raising and lowering one end of said driving shaft.

7. In a street sweeper, the combination with a wheeled frame, of a rotary brush inclined to said frame, a yoke carrying said brush, yielding means engaging with said yoke intermediate of its ends for raising and lowering said brush, a driving shaft for said brush, and means for raising and lowering one end of said driving shaft.

8. In a street sweeper, the combination with a wheeled frame, of a rotary brush inclined to said frame, a yoke carrying said brush, yielding means engaging with said yoke intermediate its ends for raising and lowering said brush, a driving shaft for said brush, means for raising and lowering one end of said driving shaft, and connections between the other end of said driving shaft and said frame.

9. In a street sweeper, the combination with a wheeled frame, of a rotary brush, a yoke carrying said brush, a lever centrally connected to said yoke by a universal joint, and means for raising and lowering one end of said yoke.

10. In a street sweeper, the combination with a wheeled frame, of a rotary brush, a yoke carrying said brush, a lever centrally connected to said yoke by a universal joint, means for raising and lowering one end of said yoke, and a link connecting the other end of said yoke to said frame.

11. In a street sweeper, the combination with a wheeled frame, of a rotary brush, a yoke carrying said brush, a lever centrally connected to said yoke by a universal joint and having vertical movement relative to said yoke, a spring arranged to oppose the movement of said lever relative to said yoke, and means for raising and lowering one end of said yoke.

In testimony whereof, I have hereunto set my hand in the presence of the two subscribing witnesses.

GEORGE REMNSNIDER.

Witnesses:
FRANK D. HIPPLER,
W. A. ALEXANDER.